United States Patent
Srivastava et al.

(10) Patent No.: US 11,972,364 B2
(45) Date of Patent: Apr. 30, 2024

(54) AUTOMATED SERVICE DESIGN USING AI/ML TO SUGGEST PROCESS BLOCKS FOR INCLUSION IN SERVICE DESIGN STRUCTURE

(71) Applicant: Dell Products L. P., Round Rock, TX (US)

(72) Inventors: Puneet Srivastava, Round Rock, TX (US); Donald Charles Guthan, Jr., Round Rock, TX (US); Sathish Kumar Bikumala, Round Rock, TX (US); Amit Sawhney, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 951 days.

(21) Appl. No.: 16/936,513

(22) Filed: Jul. 23, 2020

(65) Prior Publication Data

US 2022/0027753 A1  Jan. 27, 2022

(51) Int. Cl.
*G06N 5/04* (2023.01)
*G06F 8/36* (2018.01)
*G06N 20/00* (2019.01)
*G06Q 10/067* (2023.01)
*G06Q 10/10* (2023.01)

(52) U.S. Cl.
CPC .......... *G06N 5/04* (2013.01); *G06F 8/36* (2013.01); *G06N 20/00* (2019.01); *G06Q 10/067* (2013.01); *G06Q 10/10* (2013.01)

(58) Field of Classification Search
CPC . G06N 5/04; G06N 20/00; G06F 8/36; G06Q 10/067; G06Q 10/10
See application file for complete search history.

(56) References Cited

U.S. PATENT DOCUMENTS

| | | | | |
|---|---|---|---|---|
| 2019/0196949 A1* | 6/2019 | Venkataraman | ...... | G06F 11/008 |
| 2019/0227902 A1* | 7/2019 | Cheng | ........................ | G06F 8/71 |
| 2019/0384621 A1* | 12/2019 | Chen | ..................... | G06F 3/0483 |
| 2019/0384657 A1* | 12/2019 | Chen | ........................ | G06F 9/451 |
| 2020/0125948 A1* | 4/2020 | Modi | ..................... | G06N 3/045 |

OTHER PUBLICATIONS

A Venkataraman, "Machine Learning Techniques for Building a Large Scale Production Ready Classifier" (Year: 2015).*

* cited by examiner

*Primary Examiner* — Phillip H Nguyen
(74) *Attorney, Agent, or Firm* — Krishnendu Gupta; Deepika Bhayana; Nikhil Patel

(57) ABSTRACT

A system of one or more computers can be configured to facilitate the design of a service. The disclosed system may operate to add a process block to a service design structure for the service. The process block is provided to a trained AI/ML process prediction model. The trained AI/ML process prediction model suggests one or more further process blocks for addition to the service design structure based, at least in part, on the addition of the process block to the service design structure. In certain embodiments, a process block is selected from the suggested one or more further process blocks and added to the service design structure. Other embodiments of this aspect of the disclosure include corresponding computer systems, apparatus, and computer programs recorded on one or more computer storage devices, each configured to perform the actions of the methods.

17 Claims, 10 Drawing Sheets

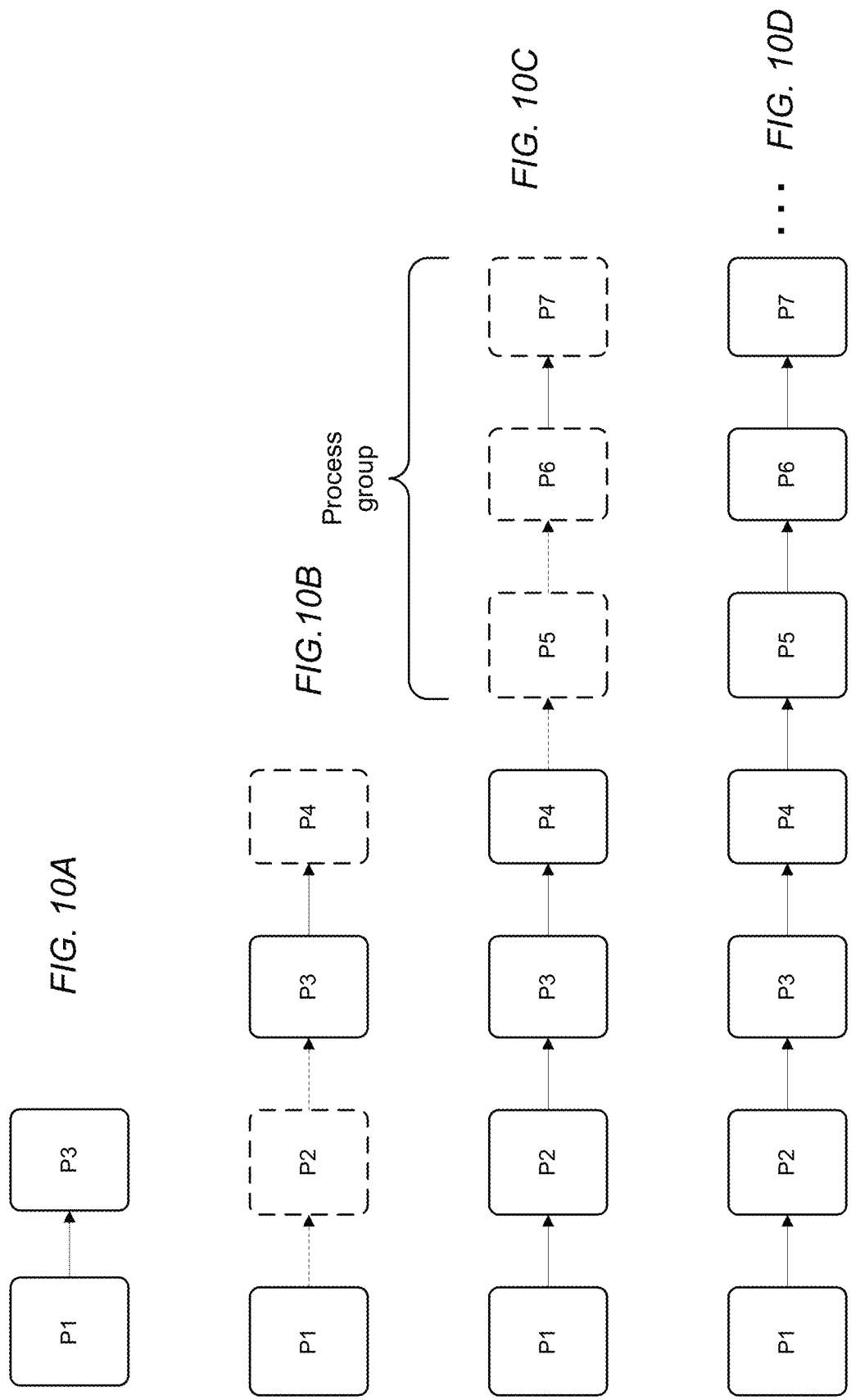

AUTOMATED SERVICE DESIGN USING AI/ML TO SUGGEST PROCESS BLOCKS FOR INCLUSION IN SERVICE DESIGN STRUCTURE

BACKGROUND OF THE INVENTION

Field of the Invention

The present disclosure relates to the design of services using process blocks, more particularly, to the design of services using Artificial Intelligence (AI) and/or Machine Language (ML) to suggest process blocks.

Description of the Related Art

As the value and use of information continues to increase, individuals and businesses seek additional ways to process and store information. Options available to users include information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Also, information handling systems may include a variety of hardware and software components that may be configured to process, store, and communicate information and may include one or more computer systems, data storage systems, and networking systems.

SUMMARY OF THE INVENTION

A system of one or more computers can be configured to perform particular operations or actions by virtue of having software, firmware, hardware, or a combination of them installed on the system that in operation causes the system to facilitate the design of a service. Certain embodiments include adding a process block to a service design structure for a service, and providing the process block to a trained AI/ML process prediction model. The trained AI/ML process prediction model suggests one or more further process blocks for addition to the service design structure based, at least in part, on the addition of the process block to the service design structure. In certain embodiments, the one or more suggested process blocks are added to the service design structure.

In at least one embodiment, the trained AI/ML process prediction model is trained using a process block catalog, wherein the process block catalog includes process blocks that are categorized by parametric and/or technical attributes of the process blocks. In certain instances, the trained AI/ML process prediction model is trained using service design structures of a plurality of services.

In at least one embodiment, the trained AI/ML process prediction model suggests the one or more further process blocks based on a context of the process blocks added to the service design structure from the suggested process blocks.

In at least one embodiment, the trained AI/ML process prediction model suggests the one or more further process blocks based on a comparison of the process blocks in the service design structure with process blocks in other service design structures constructed for similar services.

BRIEF DESCRIPTION OF THE DRAWINGS

The present disclosure may be better understood, and its numerous objects, features, and advantages made apparent to those skilled in the art by referencing the accompanying drawings. The use of the same reference number throughout the several figures designates a like or similar element.

FIG. 10A through FIG. 10D show an exemplary sequence of process block suggestions for use in a service design structure as process blocks are added.

DETAILED DESCRIPTION

Figure 1:
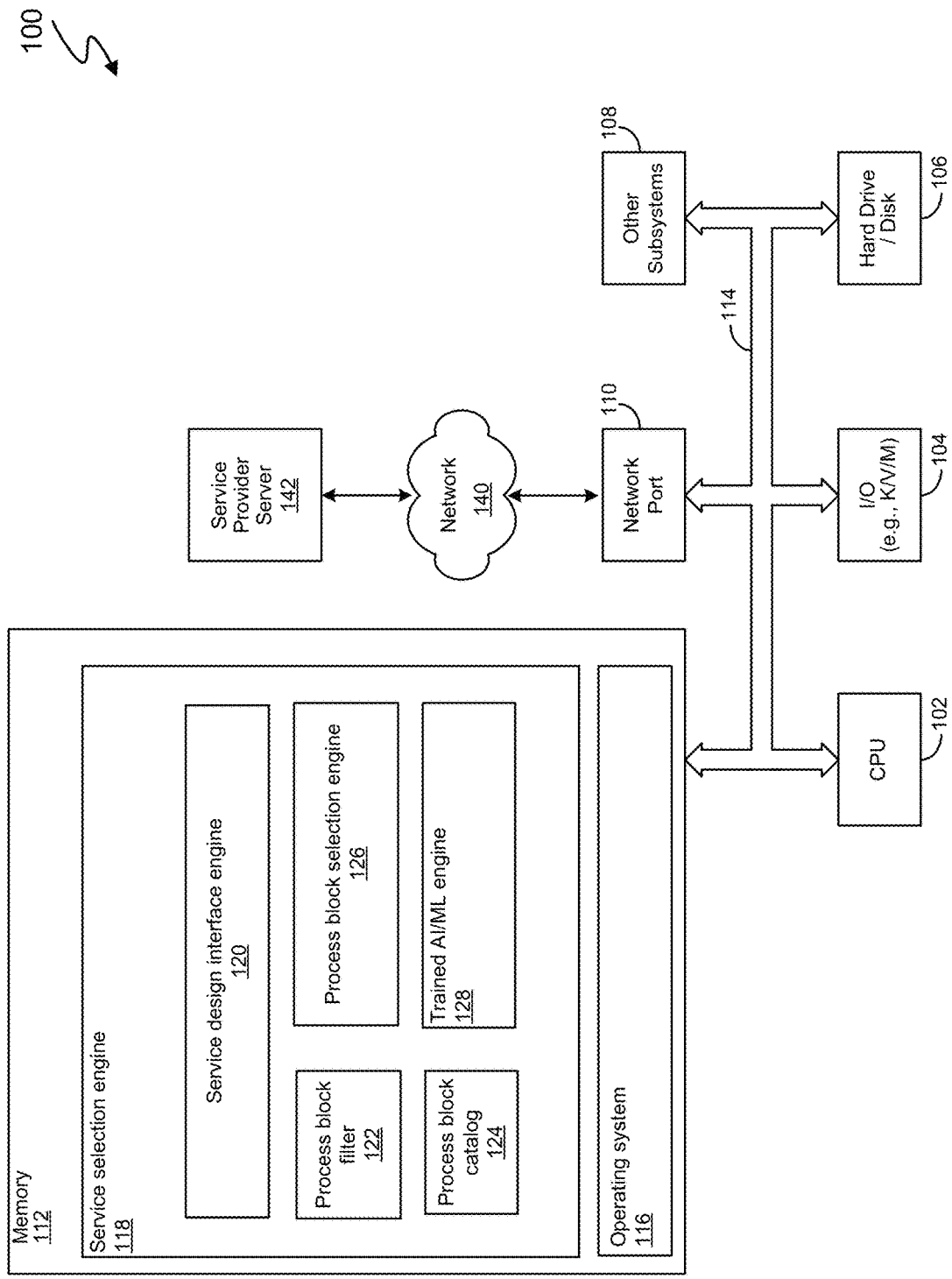
FIG. 1 is a generalized illustration of an information handling system that is configured to implement certain embodiments of the system and method of the present disclosure.

IHS may be used in the design and execution of services. Services may be constructed using process blocks that are designed to execute specific functions to accomplish the desired service result. In reference to computer software, a service is software that performs automated tasks, responds to hardware events, or listens for data requests from other software. In a user's operating system, these services are often loaded automatically at startup and run in the background without user interaction.

Certain embodiments of the disclosed system are implemented with a recognition that an enterprise may include process blocks having overlapping and/or the same functions. Certain embodiments of the disclosed system are also implemented with a recognition that process blocks having overlapping and/or the same functions may be reused in the design of different services without the need to design a new process block having the desired function. Still further, certain embodiments of the disclosed system are implemented with a recognition that certain process blocks are frequently used together with other process blocks in the implementation of a service.

Generally stated, certain embodiments of the disclosed system are configured for use in designing services. In at least one embodiment, the system includes a process block catalog in which process blocks are assigned functional attributes that may be filtered to identify process blocks having one or more selected functional attributes. In at least one embodiment, the process block catalog is used with a services database to generate process maps that may be used to train an AI/ML process prediction model. In at least one embodiment, a service designer selects process blocks, and one or more of the selected process blocks are input to a trained AI/ML process prediction model. The trained AI/ML process prediction model may be configured to identify existing process blocks that are often used with the selected process blocks, thereby facilitating user selection of existing process blocks while generally reducing the need to create new process blocks. In certain embodiments, a selected process block may be used in the service design. In certain embodiments, a selected process block may be readily modified to fit in with the service design requirements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. Although certain embodiments of the system and method of the present disclosure are described with reference to a single IHS, it will be recognized, in view of the teachings of the present disclosure, that the functionality of the disclosed system may be distributed across multiple IHS. In certain embodiments, multiple IHS are configured to communicate with one another over a communication link, such as a network. Further, it will be recognized, in view of the teachings of the present disclosure, that variations of the IHS architecture may be used to implement the disclosed systems and methods.

In the example shown in FIG. 1, The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140. In certain embodiments, the system may be accessible by a service provider server 142.

The information handling system 100 likewise includes system memory 112, which is interconnected to the foregoing via one or more buses 114 or other suitable means. System memory 112 further comprises an operating system 116 and, in various embodiments, may also comprise other software modules and engines configured to implement certain embodiments of the disclosed system. System memory 112 may include memory that is accessed locally at the information handling system 100 and/or memory that is distributed amongst one or more memory devices, storage systems, and/or memory accessible at other information handling systems within a networked environment.

In the example shown in FIG. 1, system memory 112 includes a service selection engine, which allows a user to design a service using process blocks. The service selection engine 118 may include a service design interface engine 120 configured to facilitate interaction between a user and components of the service selection engine 118. Using the service design interface engine 120, the user may select process block attributes to be used by a process block filter 122. The process block filter 122 may search a process block catalog 124 to identify process blocks having the selected process block attributes. Identified process blocks may be provided to a process block selection engine 126, which is configured to display the identified process blocks to a user through, for example, the service design interface engine 120. Certain embodiments of the disclosed system also allow the user to and an identified process block to the service design structure. The selection and addition of the process block suggested by the process block selection engine 126 may be made through the service design interface engine 120. Once a process block is selected, the selected process block may be added and displayed to the user and a graphical representation of the service design structure.

The process block selected by the user may be provided from the process block selection engine 126 to an input of a trained AI/ML engine 128. The trained AI/ML engine 128 is trained using process blocks included in service maps of other services that have been designed and/or implemented within the enterprise. The training allows the AI/ML engine 128 to suggest one or more process blocks that may be used in the design of the service. In certain embodiments, the suggested process blocks correspond to process blocks that typically follow the selected process block in other services of the enterprise. In certain embodiments, the suggested process blocks correspond to process blocks that are typically used in the context of other process blocks. For example, the user may select a process block for inclusion in the service design. The AI/ML engine 128 may analyze the selected process block in the context of other process blocks currently employed in the service design structure and suggest one or more additional process blocks for inclusion in the service design structure.

Figure 2:
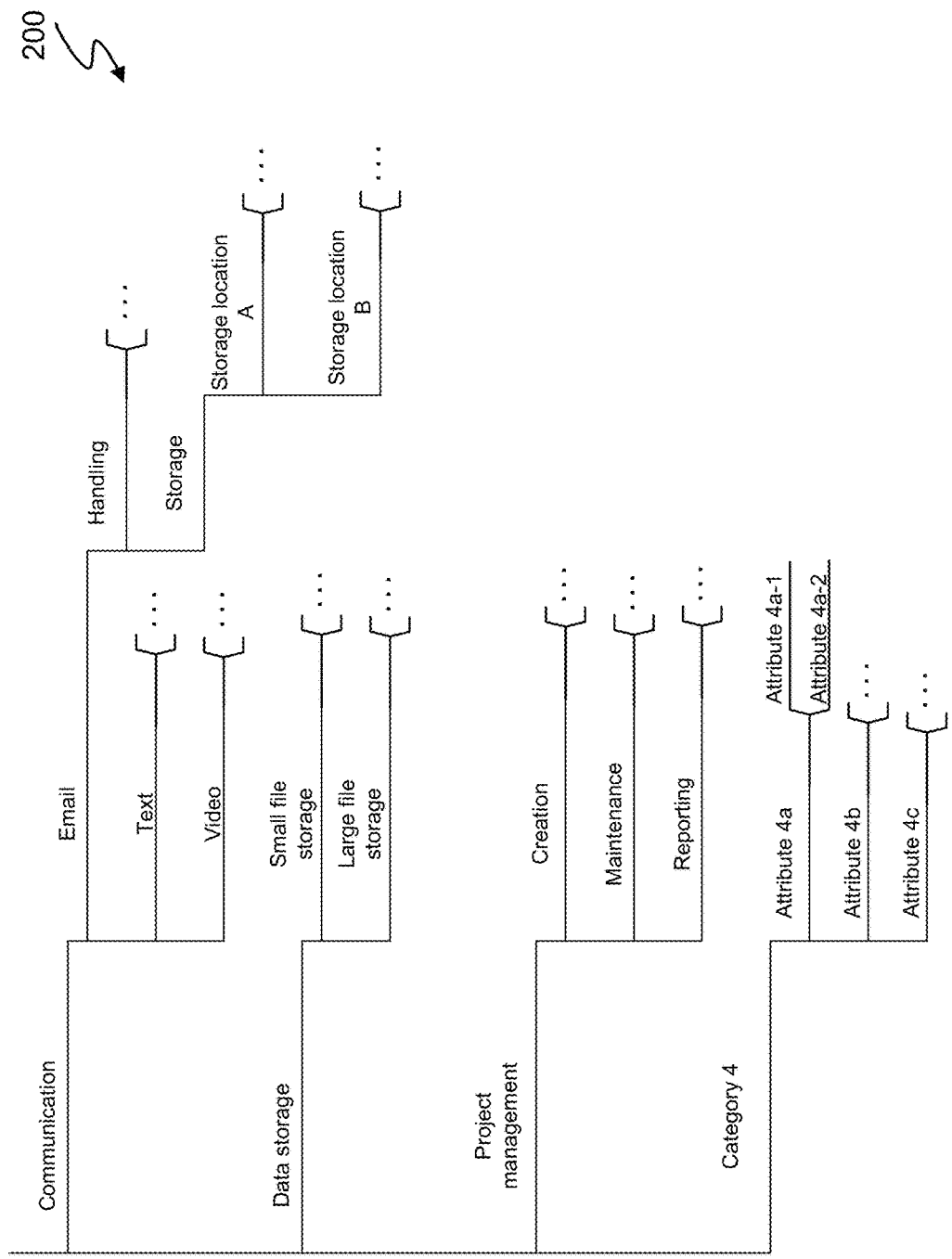
FIG. 2 shows an exemplary data structure that may be used to implement a process block catalog.

FIG. 2 shows an exemplary data structure 200 that may be used to implement the process block catalog 124. The specific example shown in FIG. 2 is shown with four general categories of process blocks (e.g., communication, data storage, project management, and category 4) to which the process blocks of the process block catalog 124 may be assigned. Process blocks in the general categories may be further divided according to corresponding attributes in a tree-type structure.

As shown in the example of FIG. 2, process blocks falling within the general category "Communication" may be assigned attributes corresponding to the type of communication implemented by the process blocks. Here, process blocks included in the general category "Communication" may be assigned attributes based on the type of communication facilitated by the process block. In FIG. 2, process blocks falling within the category "Communication" are assignable to attribute groups corresponding to whether the process block uses "email," "text," or "video" for the communication. Process blocks having further attributes falling within the domain of a parent attribute (e.g., "Email") may be assigned one or more further attributes. For example, process blocks having the attribute "Email" may be assigned one or more further attributes, shown here as "Handling" and "Storage" attributes. In this example, the "Handling" attribute is used to identify the particular manner in which a process block handles an email. The "Storage" attribute may be used to identify process blocks having particular storage requirements. In this example, the "Storage" attribute may be assigned to processing blocks having storage attributes corresponding to the location at which the process block stores emails. In this example, storage attributes of the email process blocks may have an attribute indicating whether the process block stores emails in "Storage location A" versus "Storage Location B."

Process blocks may also be assigned to one or more of a "Data storage" category and "Project management" category. Process blocks falling in the category of "Data storage" may be assigned attributes corresponding to whether the process block is directed to storing small files (e.g., "Small file storage") or storing large files (e.g., "Large file storage"). Process blocks falling in the category of "Project management" may be assigned one or more attributes corresponding to various manners in which the process block is used in the management of projects. In this example, process blocks used in the creation of a project may be assigned an attribute corresponding to the "Creation" of the process. Process blocks used in maintaining a project may be assigned an attribute corresponding to "Maintenance" of the project. Process blocks used in generating reports for a project may be assigned an attribute corresponding to the "Reporting" of the project.

FIG. 2 also shows an exemplary organization of a generic category, shown here as Category 4. In this example, process blocks falling within Category 4 may be assigned various attributes. In the specific example shown in FIG. 2, process blocks falling within Category 4 may be assigned to one or more attributes: "Attribute 4a", "Attribute 4b", and "Attribute 4c." As further shown in this specific example, process blocks having "Attribute 4a" may be further assigned one or more of two attributes: "Attribute 4a-1" and "Attribute 4a-2."

FIG. 2 illustrates just a few of the categories and attributes that may be assigned to a process block. For example, different categories and attributes may be employed other than those shown. Further, it will be recognized, based on the teachings of the present disclosure, that the assignment of a category and/or attribute to a process block may occur in an exclusive manner such that a process block is only assigned a single category and corresponding attributes that lie along a single classification branch of the exemplary data structure 200. However, the assigned category and corresponding attributes need not occur in such a mutually exclusive manner. Rather, a given process block may be assigned multiple categories and attributes in the process block catalog. As such, a given process block may be concurrently assigned to different general categories. For example, a process block may be assigned to both the "Data storage" and "Project management" categories. Further, a given process block may be assigned multiple attributes within a general category. For example, a process block in the general category "Data storage" may have technical attributes used in both "Small file storage" and "large file storage." As such, the exemplary data structure 200 may be implemented to organize process blocks according to the needs of the organization.

Figure 3:
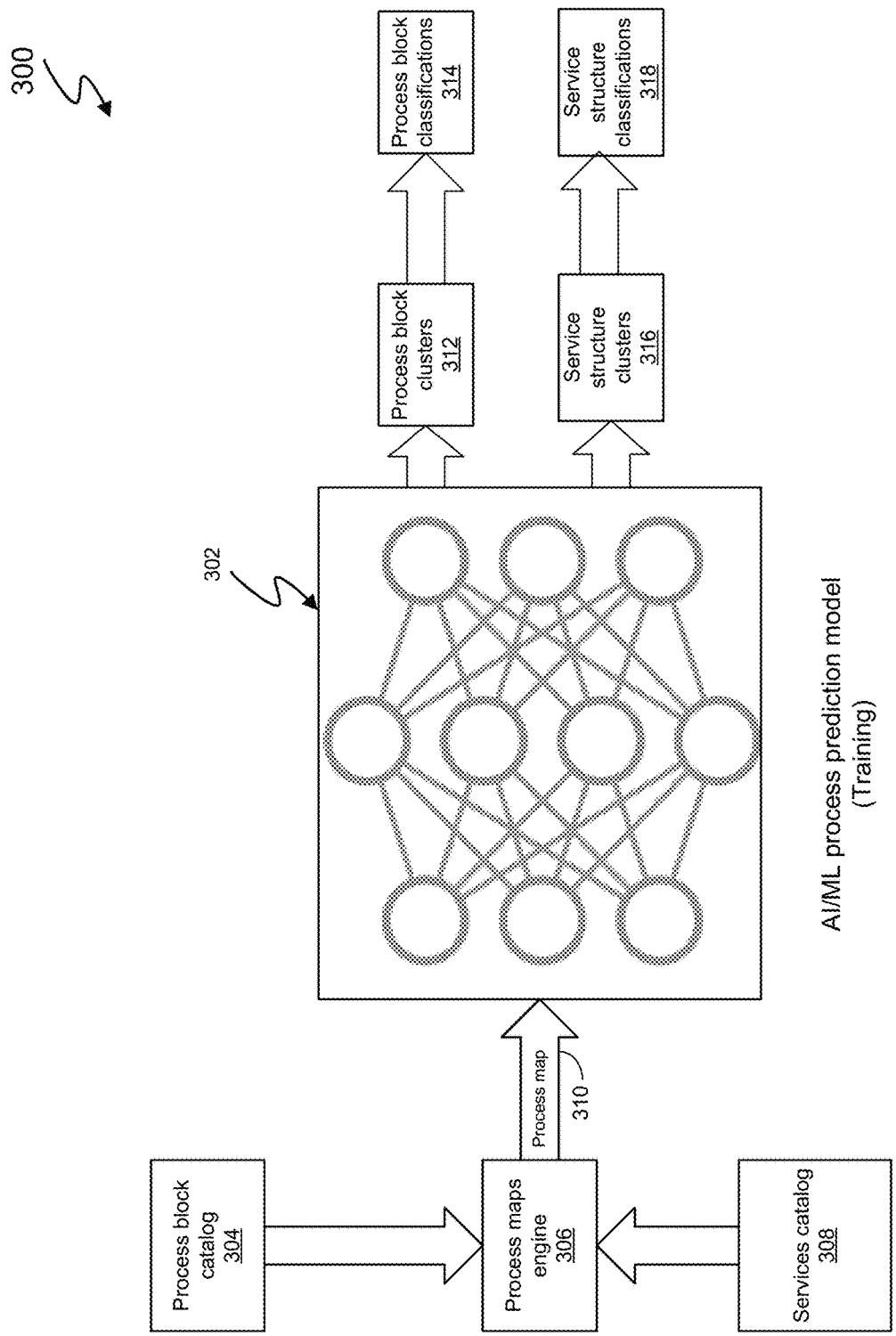
FIG. 3 is a schematic diagram showing one manner in which an AI/ML process prediction model may be trained using unsupervised learning.

FIG. 3 is a schematic diagram 300 showing one manner in which an AI/ML process prediction model 302 may be trained using unsupervised learning. In this example, the AI/ML process prediction model 302 is implemented as a neural network. A process block catalog 304, such as one having a data structure similar to the data structure shown in FIG. 2, is provided to the input of a process maps engine 306. The process block catalog may include a catalog of process blocks that have been designed for use in the services of services catalog 308. In certain embodiments, the services catalog 308 includes service design structures used to implement various services, where each service design structure comprises a linked set of process blocks. In certain embodiments, the process maps engine 306 correlates the process blocks in the process block catalog 304 with the service design structures in the service catalog 308 to generate a process map 310 that is provided to the input of the AI/ML process prediction model 302. In one example, process map 310 includes information relating to how the process blocks stored in the process block catalog 304 are arranged and/or used in the service design structures stored in the service catalog 308.

The initial training of the AI/ML process prediction model 302 may take place using unsupervised training. During the unsupervised training operations, the AI/ML process prediction model 302 generates process block clusters 312. The process block clusters 312 may be used to generate process block classifications that, in turn, can be divided into process block classifications 314 that can be labeled for use in a subsequent supervised training operation of the AI/ML process prediction model 302. In certain embodiments, the unsupervised training of the AI/ML process prediction model 302 also generates service structure clusters 316 that, in turn, can be divided into service structure classifications 318 that can be labeled for use in a subsequent supervised training operation of the AI/ML process prediction model 302.

Figure 4:
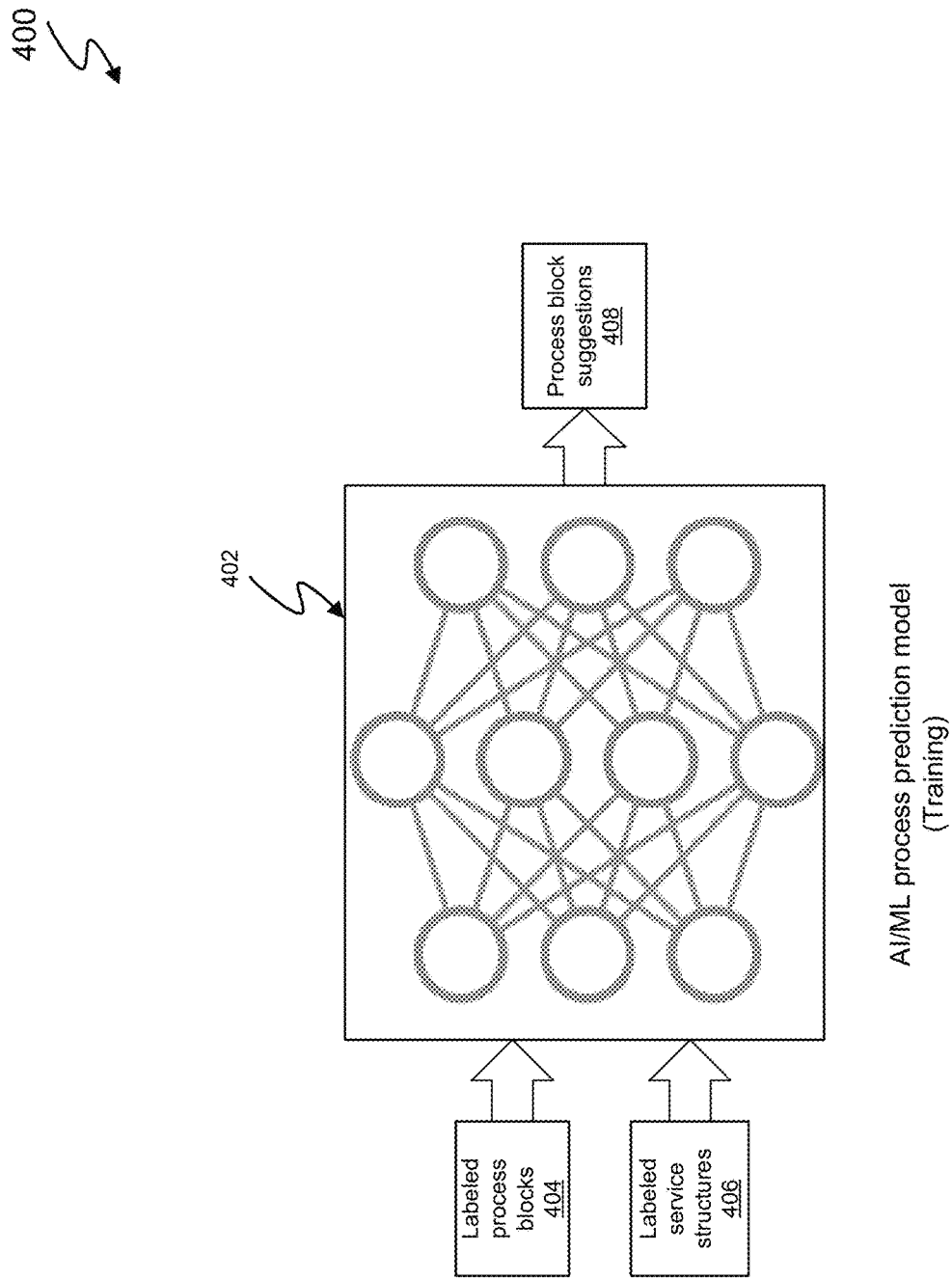
FIG. 4 is a schematic diagram showing one manner of training an AI/ML process prediction model using supervised learning.

FIG. 4 is a schematic diagram 400 showing one manner of training a AI/ML process prediction model 402 using supervised learning. In this example, the AI/ML process prediction model 402 is configured to receive labeled process blocks 404 and, optionally, labeled service structures 406 to generate process block suggestions 408. The parameters of the neurons of the AI/ML process prediction model 402 may be adjusted by applying training data to the input and checking the accuracy of the output. In one embodiment, the training data includes a set of labeled process blocks, a set of labeled service structures, and a corresponding set of process block suggestions. The AI/ML prediction model 302 and AI/ML process prediction model 402 may be implemented within the same neural network. Additionally, or in the alternative, the AI/ML process prediction models 302 and 402 may be implemented separately, where the AI/ML process prediction model 302 is configured to execute unsupervised training, and the AI/ML process prediction model 402 is configured to execute supervised training. In certain embodiments, only the AI/ML process prediction model 402 is trained without any prior classifications that may otherwise be provided from the AI/ML process prediction model 302. In certain embodiments, process block classifications 314 provided by the AI/ML process prediction model 302 are used to generate labeled process blocks 404. In certain embodiments, the service structure classifications provided by the AI/ML process prediction model 302 are used to generate the labeled service structures 406.

Figure 5:
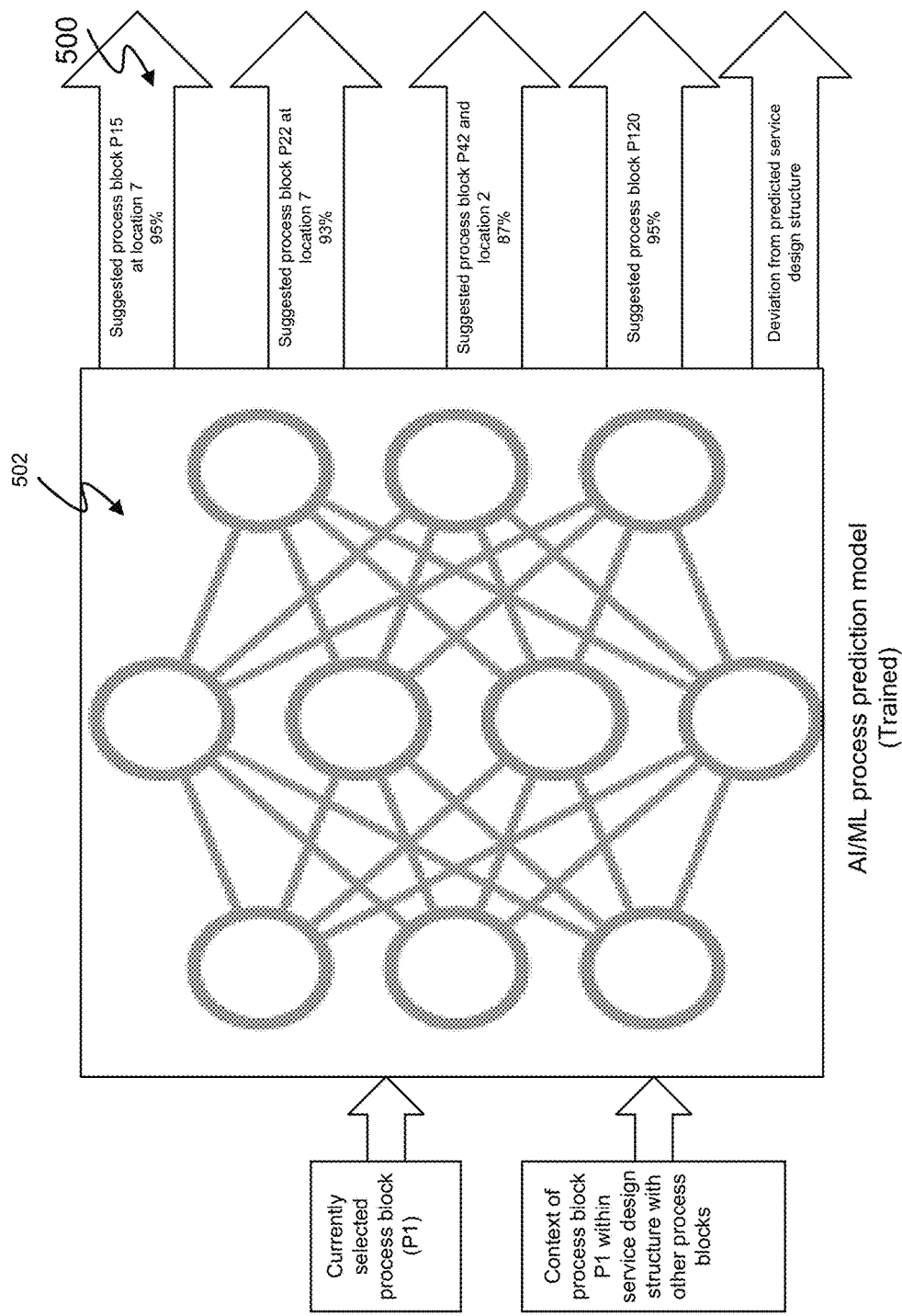
FIG. 5 is a schematic diagram showing one manner in which a trained AI/ML process prediction model may operate in the context of a service selection engine.

FIG. 5 is a schematic diagram 500 showing one manner in which a trained AI/ML process prediction model 502 may operate in the context of a service selection engine. In this example, a process block, shown here as P1, is selected by a user for inclusion in a service design structure. Based on the selection of process block P1, the AI/ML process prediction model 502 suggests one or more process blocks that may be coupled with process block P1 in the service design structure. For example, the AI/ML process prediction model 502 may include a process block in the set of suggested process blocks based on how frequently the process block follows process block P1 across all service design structures. In such systems, the number of times that a process block follows process block P1 across all service design structures of all services may be used as a basis to suggest process blocks that may follow process block P1. In certain embodiments, the suggested process blocks are displayed with a corresponding confidence level that the suggested process block should follow process block P1. For example, the number of times a given process block in the set of suggested process blocks follows process block P1 may be normalized with the number of times that other process blocks in the set of suggested process blocks follow process block P1. The normalized values may be expressed as percentage values indicating the confidence level associated with each of the process blocks of the set of process blocks.

In certain embodiments, the context of process block P1 is analyzed within the service design structure with respect to other process blocks. The context of the process block P1 in the service design structure may be provided to the trained AI/ML process prediction model and compared with service design structures of similar services to provide the process block suggestions.

Additionally, or in the alternative, certain embodiments of the AI/ML process prediction model 502 are trained to use the context of the selected process block within the service design structure and compare the service design structure with other service design structures of similar services. In the example shown in FIG. 5, the context of process block P1 within the service design structure under construction is provided with other processes in the service design structure to an input of the AI/ML process prediction model 502. In such embodiments, the AI/ML process prediction model 502 uses the placement of process block P1 with respect to other process blocks to predict the service design structure. In certain embodiments, the service design structure for the service under construction may be compared to other service design structures to suggest process blocks that may be added to different portions of the service design topology of the service design under construction. As an example, rather than considering all instances in which a given process block follows or is otherwise used with process block P1 across all service design structures, the AI/ML process prediction model 502 suggests process blocks that have been used with process block P1 in other service design structures for services that are identical to or similar to the predicted service design structure.

In FIG. 5, the AI/ML process prediction model 502 has suggested three process blocks that may be used with process P1 in the process design structure. A confidence level, expressed as a percentage, is provided with each of the suggested process blocks. Here, the suggested process block P15 has a confidence level of 95%. The suggested process block P22 has a confidence level of 93%. The suggested process block P42 has a confidence level of 87%. In most instances, the user will select the suggested process block having the highest confidence level, shown here as process block P15.

In certain embodiments, the suggested process blocks have been identified based on an analysis of the type of service under construction and a comparison of where process block P1 lies within the service design structure under construction with where the process block P1 lies in the service design structure of the predicted type of service. The context in which the process block P1 appears in the predicted service type is used to identify suggested process blocks as determined from similar service design structures. As an example, the addition of process block P1 to the service design structure, along with other existing process blocks within the service design structure, may be used to predict the type of service design structure the user is attempting to design. Similar service design structures used in other services are used in suggesting other service blocks. Therefore, rather than suggesting process blocks that follow or are otherwise used with process block P1 across all service design structures, the AI/ML process prediction model 502 suggests process blocks that follow or are otherwise used with P1 within services having design structures that are identical or similar to the predicted type of service under construction. Additionally, or in the alternative, the suggested process blocks may further suggest where the suggested process blocks should be located within the service design structure, as described in further detail herein.

In the example shown in FIG. 5, process blocks P15, P22, and P42 have been suggested along with a suggested location of the process blocks within the topology of the service design structure. In this example, the AI/ML process prediction model 502 has suggested using either process block P15 or process block P22 at location 7 in the service design structure. Since process block P15 has a higher confidence level than process block P22, process block P15 is the logical selection for the process block at the location 7. Process block P42 has been suggested for location 2 within the service design structure.

The predicted service type may be used in a number of different manners to provide suggestions for process blocks in the service design structure. For example, if the predicted service design structure corresponds to a communication service, the AI/ML process prediction model 502 may suggest using process block P120 (e.g., a video process block) within the predicted service design structure (e.g., design structure for a communication service) whether or not process block P120 is to be tied directly to the predicted design structure. In such instances, suggested process block P120 may also include a confidence level. In one example, the confidence level may correspond to the percentage of communication services that include suggested process block P120.

Figure 6:
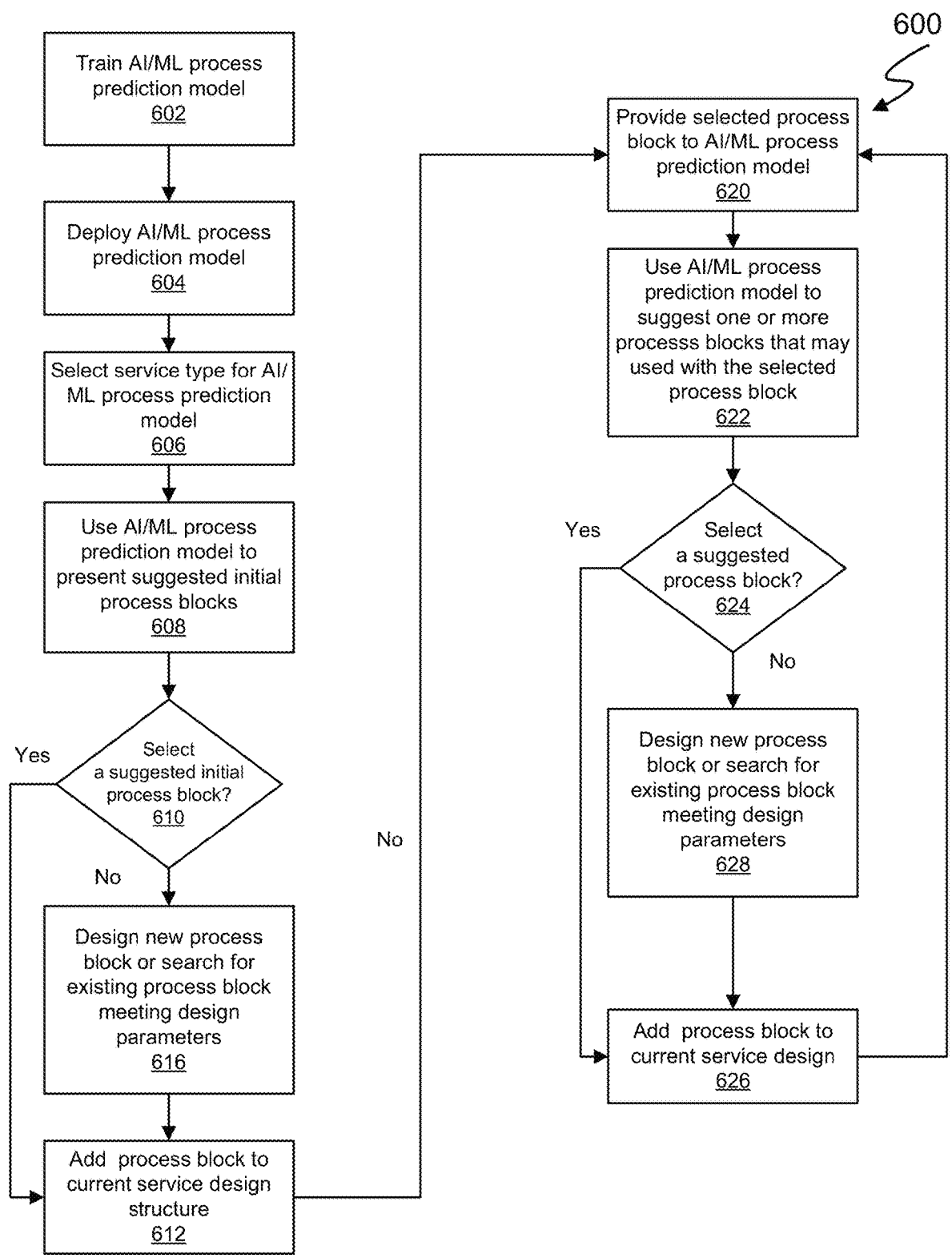
FIG. 6 is a flowchart of exemplary operations that may be executed in certain embodiments of the disclosed system.

FIG. 6 is a flowchart 600 of exemplary operations that may be executed in certain embodiments of the disclosed system. In this example, the AI/ML process prediction model is trained at 602 and deployed at 604 for use by a service configuration engine. At 606, certain embodiments allow the user to select the type of service that is being constructed, which may be provided to the AI/ML process prediction model (although in other embodiments, the type of service is predicted at a later time based on the process blocks currently used in the service design structure under construction). Based on the type of service that is being constructed, the AI/ML process prediction model suggests one or more initial process blocks to start the service design structure at 608.

At 610, the user can either select one of the suggested process blocks, design a new process block, or search for a process block meeting certain design parameters for inclusion in the service design structure. If the user wants to add a process block from the suggested process blocks, the selection of a suggested process block occurs at 612. Otherwise, the user may choose to design a new process block or search for an existing process block meeting design parameters at 616 and add it to the service design structure at 626. The user may elect at any time during the service design process to halt and/or store the current service design structure.

Once the initial process block has been added, the selected process block is provided to the AI/ML process prediction model at 620. At 622, the AI/ML process prediction model uses the added process block as an input to suggest one or more process blocks that may accompany the newly added process block. The user may decide whether or not to add a suggested process block at 624. If the user wishes to add a process block from the suggested process blocks, the user may do so at 626. However, if the user elects not to use a suggested process block at 624, the user may design a new process block or search for an existing process block that meets design parameters at 628 and add it to the current service design structure at 626. The operations shown at 620 through 626 (inclusive of 628) may be executed until such time as the service design, or portion thereof, is complete.

Figure 7:
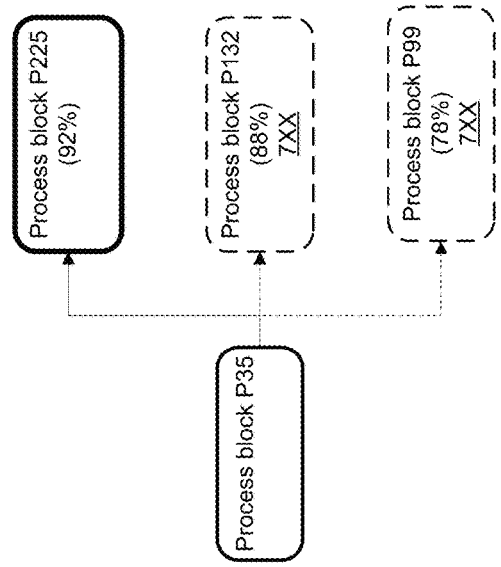
FIG. 7 shows an exemplary interface that may be used to graphically add process blocks in certain embodiments of the disclosed system.

FIG. 7 shows an exemplary interface 700 that may be used to graphically add process blocks in certain embodiments of the disclosed system. In this example, the user has selected process block P35 as the initial process block in the service design structure. Upon selection of the process block P35 by the user, process block P35 appears prominently in the service design structure region 702. In this example, process block P35 is provided to the input of the AI/ML process prediction model. Based on the provision of process block P35, the AI/ML process prediction model of the illustrated example has identified three process blocks that may follow process block P35. The process blocks include process block P225 having a confidence level of 92%, process block P132 having a confidence level of 89%, and process block P99 having a confidence level of 78%.

In FIG. 7, the suggested process blocks are displayed in phantom outline until such time as one of the process blocks is selected for addition to the service design structure. The user may select which of the suggested process blocks are to be added in a number of different manners. In certain embodiments, such as the graphical example shown in FIG. 7, the user may execute an actuation technique (e.g., double-clicking the left button of a mouse on a process block) to select an object representing the process block. The actuation results in the addition of the process block to the service design structure.

In FIG. 7, the user has selected process block P225 for inclusion in the service design structure, which is then added to the graphical depiction of the service design structure shown in region 712. When the process block P225 is added to the service design structure, the graphical representation of process block P225 is displayed prominently as the process block following process block P35.

Figure 8:
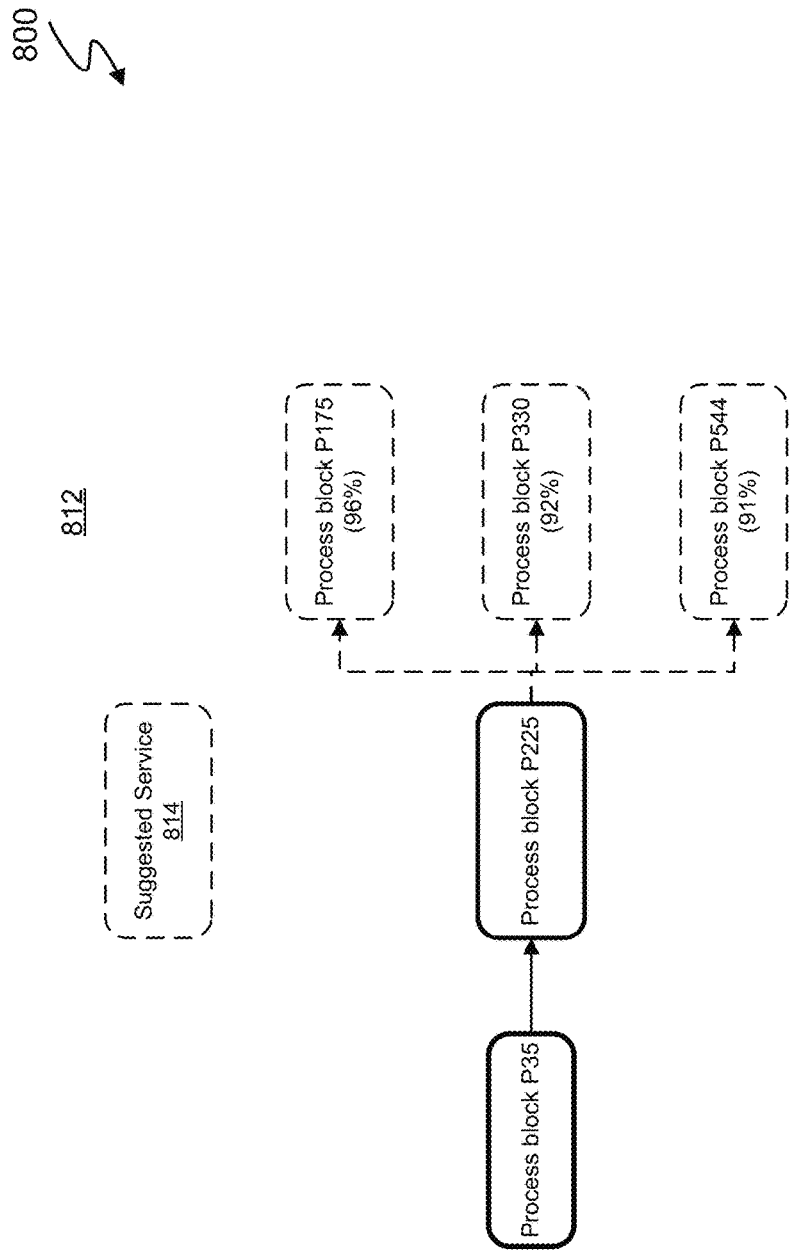
FIG. 8 shows an exemplary interface that may be used to graphically add process blocks in certain embodiments of the disclosed system after the selection of a process block in FIG. 7.

FIG. 8 shows an exemplary interface 800 that may be used to graphically add process blocks in certain embodiments of the disclosed system after the selection of a process block in FIG. 7. In this example, the user has selected process block P225 from FIG. 7 as the process block that follows process block P35 in the service design structure. Process block P225 is added to the service design structure and shown in prominent graphical form in the service design structure depicted in region 812. In this example, upon the addition of process block P225 to the service design structure, the AI/ML process prediction model suggests three process blocks that may follow process block P225. The process blocks include: process block P175 having a confidence level of 96%, process block P330 having a confidence level of 92%, and process block P244 having a confidence level of 91%. The AI/ML process prediction model has also suggested a service 814 to accompany the service design structure. Again, the user may graphically select one of the process blocks to add to the process design structure shown in region 812. In certain embodiments, foregoing processes may be repeated until such time as the service has been completely or partially designed.

Although the service design structure discussed with respect to FIG. 7 and FIG. 8 has been created using a selection of sequential process blocks, it will be recognized, based on the teachings of the present disclosure, that the arrangement of the process blocks of the service design structure may be dependent on the type of service that is being designed. For example, the service may require the connection of project blocks in parallel. In certain embodiments, the AI/ML process prediction model suggests the inclusion of multiple process blocks that are connected in parallel and displays them as such in the service design structure. In another example, the AI/ML process prediction model may project that a particular service is often used with the service design structure under construction. In such instances, the service may be suggested a specific reference as to where the suggested service should be added. For example, the AI/ML process prediction model may determine that a communication service is under construction. Based on the training of the AI/ML process prediction model, the user may be presented with one or more types of billing services typically used with communication services.

Figure 9:
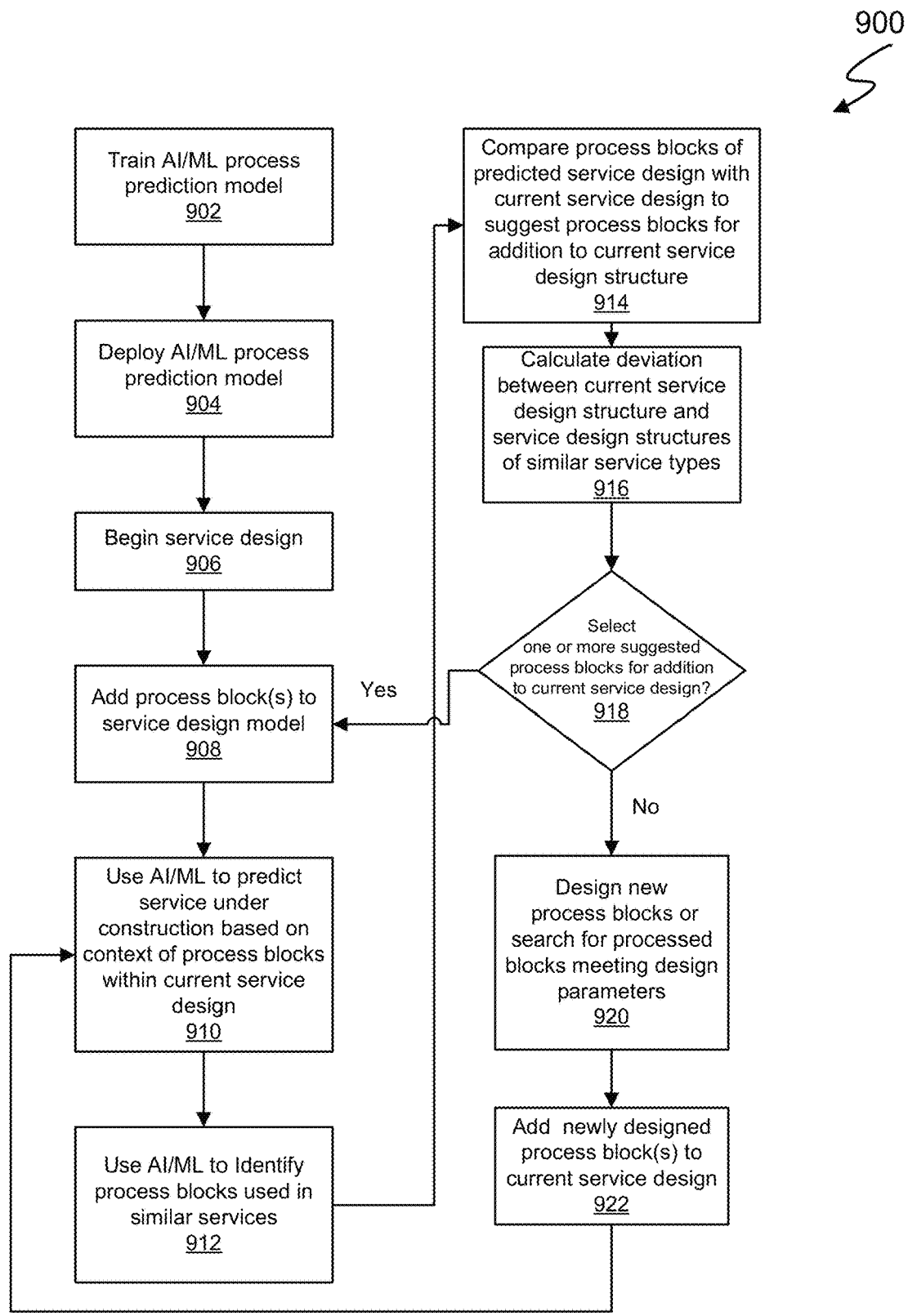
FIG. 9 is a flowchart illustrating exemplary operations that may be executed in certain embodiments of the disclosed system when a service design structure is designed in view of one or more existing service design structures associated with similar services.

FIG. 9 is a flowchart 900 illustrating exemplary operations that may be executed in certain embodiments of the disclosed system when a service design structure is designed in using one or more existing service design structures associated with similar services. In this example, the AI/ML process prediction model is trained at 902 and deployed at 904. Service design begins at 906 with the addition of process blocks to the service design model at 908. At 910, the AI/ML process prediction model makes a prediction as to what type of service is under construction based on the context of the process blocks within the current service design structure. At 912, the AI/ML process prediction model identifies services and/or service design structures used in similar services. At 914, the predicted service design structure is compared with the service design structures of similar services to suggest process blocks for addition to the service design structure under construction. Additionally, certain embodiments may calculate a deviation value representing the degree to which the current service design structure deviates from comparable service design structures for similar services.

At 918, the user may select one or more of the suggested process blocks for addition to the current service design structure. If any of the suggested process blocks are selected by the user for addition to the current service design structure, the process blocks are added to the service design structure at 908, and the suggestion/selection/addition operations continue. In certain embodiments, the user may not want to use any of the suggested process blocks, in which case the user may design one or more new process blocks or search for process blocks meeting design parameters at 920. The new process blocks and/or process blocks found during the search are added to the service design structure at 922 before continuing with the suggestion/selection/addition operations.

FIG. 10A through FIG. 10D show an exemplary sequence of process block suggestions for use in a service design structure as process blocks are added. In FIG. 10A, the process design structure includes process block P1 followed by process block P3. Based on the process design structure, the AI/ML process prediction model suggests the service design structure shown in FIG. 10B. As shown in FIG. 10B, the AI/ML process prediction model has suggested locating process block P2 between process block P1 and P3, and following process block P3 with process block P4.

Assuming that the user accepts the suggestions shown in FIG. 10B, the service design will have the service design structure shown in FIG. 10C. In the example shown in FIG. 10C, the user has opted to add suggested process blocks P2 and P4 at their respective locations within the suggested service design structure. Based on the service design structure of P1→P2→P3→P4, the AI/ML process prediction model has suggested adding an entire process group to the service design structure. In this example, the process group proceeds from process block P4 and includes a sequence of process blocks P5⊖P6→P7. FIG. 10D depicts the service design structure once the process group suggested in FIG. 10C has been added by the user.

The example systems and computing devices described herein are well adapted to attain the advantages mentioned as well as others inherent therein. While such systems have been depicted, described, and are defined with reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in view of the present disclosure. The depicted and described embodiments are examples only and are in no way exhaustive of systems and methods that fall within the scope of the claims.

Such example systems and computing devices are merely examples suitable for some implementations and are not intended to suggest any limitation as to the scope of use or functionality of the environments, architectures, and frameworks that can implement the processes, components, and features described herein. Thus, implementations herein are operational within numerous environments or architectures and may be implemented in general purpose and special-purpose computing systems, or other devices having processing capability. Generally, any of the functions described with reference to the figures can be implemented using software, hardware (e.g., fixed logic circuitry), or a combination of these implementations. The term "module," "mechanism," "component," or "engine" as used herein generally represents software, hardware, or a combination of software and hardware that can be configured to implement prescribed functions. For instance, in the case of a software implementation, the term "module," "mechanism," "component" or "engine" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components, and modules described herein may be implemented by a computer program product.

Furthermore, this disclosure provides various example implementations, as described and as illustrated in the drawings. However, this disclosure is not limited to the implementations described and illustrated herein but can extend to other implementations, as would be known or as would become known to those skilled in the art in view of the teachings of the present disclosure. Reference in the specification to "one implementation," "this implementation," "these implementations," "some implementations," "in certain embodiments" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms and that the systems described herein apply equally regardless of the particular type of computer-readable media used to carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the descriptions herein are intended to be illustrative and should not be taken to be limiting. As will be appreciated in light of the present disclosure, other embodiments are possible. Those skilled in the art, in view of the teachings of the present disclosure, will readily implement the steps necessary to provide the structures and the methods disclosed herein and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

What is claimed is:

1. A computer-implemented method for use in designing a service, the method comprising:
   adding a process block to a service design structure for a service, wherein the process block corresponds to a plurality of process block in a category divided according to corresponding attributes in a tree-type structure;
   providing the process block to a trained AI (Artificial Intelligence)/ML (Machine Learning) process prediction model;
   using the trained AI/ML process prediction model to suggest one or more further process blocks for addition to the service design structure based, at least in part, on the addition of the process block to the service design structure, wherein the trained AI/ML process prediction model suggests the one or more further process blocks based on a comparison of the process blocks in the service design structure with process blocks in other service design structures constructed for similar services; and
   adding one or more suggested process blocks to the service design structure.

2. The computer-implemented method of claim 1, wherein
   the trained AI/ML process prediction model is trained using a process block catalog, wherein the process block catalog includes process blocks that are categorized by parametric and/or technical attributes of the process blocks.

3. The computer-implemented method of claim 2, wherein
   the trained AI/ML process prediction model is trained using service design structures of a plurality of services.

4. The computer-implemented method of claim 1, wherein
   the trained AI/ML process prediction model suggests the one or more further process blocks based on a context of the process blocks added to the service design structure from the suggested process blocks.

5. The computer-implemented method of claim 1, further comprising:
   determining a deviation value between the process blocks of the service design structure and the process blocks of the other service design structures; and
   displaying the deviation value on a graphical user interface.

6. The computer-implemented method of claim 1, further comprising:
   assigning a confidence level value to process blocks in the one or more suggested process blocks using the trained AI/ML process prediction model; and
   displaying the confidence level value for each of the one or more further process blocks on a graphical user interface.

7. A computer system comprising:
   one or more information handling systems, wherein the one or more information handling systems include:
      a processor;
      a data bus coupled to the processor; and
      a non-transitory, computer-readable storage medium embodying computer program code, the non-transitory, computer-readable storage medium being coupled to the data bus;
   wherein the computer program code included in one or more of the information handling systems is executable by the processor of the information handling system so that the information handling system, alone or in combination with other information handling systems, executes operations comprising:
      adding a process block to a service design structure for a service, wherein the process block corresponds to a plurality of process block in a category divided according to corresponding attributes in a tree-type structure;
      providing the process block to a trained AI (Artificial Intelligence)/ML (Machine Learning) process prediction model;
      using the trained AI/ML process prediction model to suggest one or more further process blocks for addition to the service design structure based, at least in part, on the addition of the process block to the service design structure, wherein the trained AI/ML process prediction model suggests the one or more further process blocks based on a comparison of process blocks in the service design structure with process blocks in other service design structures constructed for similar services; and
      adding one or more suggested process blocks to the service design structure.

8. The computer system of claim 7, wherein
   the trained AI/ML process prediction model is trained using a process block catalog, wherein the process block catalog includes process blocks that are categorized by parametric and/or technical attributes of the process blocks.

9. The computer system of claim 8, wherein
   the trained AI/ML process prediction model is trained using service design structures of a plurality of services.

10. The computer system of claim 7, wherein
    the trained AI/ML process prediction model suggests the one or more further process blocks based on a context of the process blocks added to the service design structure from the suggested process blocks.

11. The computer system of claim 7, further comprising:
    determining a deviation value between the process blocks of the service design structure and the process blocks of the other service design structures; and
    displaying the deviation value on a graphical user interface.

12. The computer system of claim 7, further comprising:
    assigning a confidence level value to process blocks in the one or more suggested process blocks using the trained AI/ML process prediction model; and
    displaying the confidence level value for each of the one or more further process blocks on a graphical user interface.

13. A non-transitory, computer-readable storage medium embodying computer program code, the computer program code comprising computer-executable instructions configured for:
    adding a process block to a service design structure for a service, wherein the process block corresponds to a plurality of process block in a category divided according to corresponding attributes in a tree-type structure;
    providing the process block to a trained AI (Artificial Intelligence)/ML (Machine Learning) process prediction model;

using the trained AI/ML process prediction model to suggest one or more further process blocks for addition to the service design structure based, at least in part, on the addition of the process block to the service design structure, wherein the trained AI/ML process prediction model suggests the one or more further process blocks based on a comparison of the process blocks in the service design structure with process blocks in other service design structures constructed for similar services; and adding one or more suggested process blocks to the service design structure.

14. The non-transitory, computer-readable storage medium of claim 13, wherein the instructions are further configured for:
training the AI/ML process prediction model using a process block catalog, wherein the process block catalog includes process blocks that are categorized by parametric and/or technical attributes of the process blocks.

15. The non-transitory, computer-readable storage medium of claim 14, wherein the instructions are further configured for:
training the AI/ML process prediction model using service design structures of a plurality of services.

16. The non-transitory, computer-readable storage medium of claim 13, wherein
the trained AI/ML process prediction model suggests the one or more further process blocks based on a context of the process blocks added to the service design structure from the suggested process blocks.

17. The non-transitory, computer-readable storage medium of claim 13, wherein the instructions are further configured for:
determining a deviation value between the process blocks of the service design structure and the process blocks of the other service design structures; and
displaying the deviation value on a graphic user interface.

* * * * *